Patented July 20, 1954

2,684,343

UNITED STATES PATENT OFFICE 2,684,343

TREATMENT OF CELLULOSIC MATERIAL WITH ALKYLATED POLYALKYLOL MELAMINE RESINS

James K. Dixon, Riverside, and Norman T. Woodberry, Stamford, Conn., assignors to American Cyanamid Company, New York, N. Y., a corporation of Maine No Drawing. Application November 17, 1950,
Serial No. 196,344

8 Claims. (Cl. 260—15)

This invention relates to a process for improving the properties of cellulosic materials and more particularly, to the production of viscose rayon with decreased water absorption.

In the past, certain water-soluble melamine-formaldehyde resins have been added to cellulose solutions such as viscose in an effort to produce a regenerated cellulosic fiber or fabric which is animalized and which possesses good water resistance. The process was not satisfactory, however, either for animalization or for decreased water absorption because the resin is not retained sufficiently in the viscose during the cellulose regeneration process when as much as 60% to 80% of the resin is lost. In addition, when the material is dyed with an acid dye more resin is lost in the dyeing process, and hydrolysis of most or all of the remaining resin will take place in the dye bath.

Part of the above difficulty has been remedied by the process described in our copending application, Serial No. 181,564 filed August 25, 1950, now U. S. Patent No. 2,654,715 entitled "Animalization of Cellulose." According to that process we have found that sufficient resin will be retained in a cellulose solution to impart acid dyeing properties to the regenerated cellulose if the resin is added to the cellulose solution in the form of an acid colloid. The animalized regenerated cellulosic fibers possess decreased water absorption in some cases but it is not a particularly striking or significant decrease.

It is an object of the present invention, therefore, to produce a cellulosic fiber having markedly decreased water absorption.

Another object of the present invention is to produce a cellulosic fiber having decreased water absorption by addition of a resin to the cellulose solution before regeneration thereof.

It is another object of the present invention to treat a cellulose solution with a melamine-formaldehyde resin which will be retained in the regenerated cellulosic material derived therefrom in a sufficient amount to decrease its water absorption.

It is still another object of the present invention to produce an animalized cellulosic fiber having decreased water absorption.

It is a further object of the present invention to treat cellulose solutions such as viscose with melamine-formaldehyde resins which will be retained during the cellulose regeneration process.

A further object of the present invention is to treat viscose with a melamine-formaldehyde resin which will be retained during both the cellulose regeneration process and subsequent dyeing in an acid dye bath.

Still another object of the present invention is the treatment of viscose dope with certain melamine-formaldehyde resins.

The above and other objects are attained by adding an alkylated polymethylol melamine resin which contains at least three methyleneoxy groups and at least ten carbon atoms when there are only three methyleneoxy groups to a cellulose solution, and regenerating the cellulose in the usual manner.

The invention will be described in greater detail in conjunction with the following specific example which is merely illustrative and it is not intended to limit the scope of the invention to the details therein set forth. Proportions are given in parts by weight.

EXAMPLE 150 parts each of a number of different methylated methylol melamine resins as 5% aqueous solutions are added slowly with high speed agitation to 2000 part portions of cellulose xanthate solution prepared as described below. After addition of the resin is complete, the mixture is in each case stirred for ½ hour and then subjected to a 3 hour de-aerating period. The size of the resin particles is less than $0.5\mu$.

Fibers spun from the xanthate-resin mixtures are regenerated in the usual manner by treatment with an acid bath. After standing for a period of time, the regenerated cellulose films containing the resin are dried carefully at 110° C. and cured.

The water absorption and the percent nitrogen retained (as a measure of the resin retention) are measured for the fibers with the following results:

| Resin | Nitrogen Retained, Percent | Water Absorption, Percent |
|---|---|---|
| None | | 85 |
| Dimethylol melamine | Less than 0.2 | 80–85 |
| Trimethylol melamine | do | 80–85 |
| Tetramethylol melamine | do | 80–85 |
| Pentamethylol melamine | do | 80–85 |
| Methylated dimethylol melamine | do | 80–85 |
| Methylated trimethylol melamine | do | 80–85 |
| Crystalline trimethylated trimethylol melamine. | do | 80 |
| Methylated tetramethylol melamine | 0.5 | 64 |
| Methylated pentamethylol melamine | 0.6 | 61 |
| Methylated polymethylol melamine in which there are 5.5 methyleneoxy groups. | 0.5–0.6 | 57 |
| Methylated hexamethylol melamine | 0.5–0.6 | 55–60 |
| Crystalline hexamethylated hexamethylol melamine [1]. | 0.5–0.6 | 55–60 |

[1] Crystalline hexamethylated hexamethylol melamine is not sufficiently soluble in water for the preparation of a 5% solution. A solution in 95% ethyl alcohol is therefore used in this case.

NOTE.—5% resin applied on weight of viscose expected after regeneration.

The water absorption of the cellulose fibers is determined by the following procedure:

Skeins of the cellulosic fibers are washed, dried and conditioned for at least 24 hours at 73° F. and 50% relative humidity. The weight of the conditioned skein is determined by using a stoppered weighing bottle. This weight sample is then soaked in approximately 750 ml. of demineralized water for 15 minutes at room temperature. After this, the skein is opened up and placed on a 15 inch square piece of cotton twill cloth in such a manner that the wet skein forms a circle which meets the edges of the cloth tangentially. The corners of the cloth are turned into the center and the resulting smaller square piece of cloth which now holds the skein is folded into quarters. This whole "package" is soaked in the same water bath for an additional 15 minutes. Then three such triangular "packages" are placed in the 11" diameter perforated stainless steel centrifuge basket with the side of the triangular package holding the skein at the bottom of the basket. The samples are then centrifuged for 3 minutes at 2175 R. P. M. The skeins are quickly transferred to the weighing bottles and the weight of water determined, and in turn the percent water absorption.

Nitrogen retention is determined by standard Kjeldahl analysis.

*Preparation of cellulose xanthate solution*

131 parts of bleached α-cellulose are steeped in 3,000 parts of 18% caustic soda solution for 30 minutes at about 25° C. The resulting mercerized cellulose is subjected to pressure in a hydraulic press until the ratio of caustic soda to cellulose is reduced to about 3.3. The top and bottom sheets in the hydraulic press are discarded and the remaining eight middle sheets containing 150 parts of the original dry cellulose are shredded for 50 minutes in a suitable dough mixer and then aged for 3 hours. The resulting alkali cellulose is titrated with acid and found to contain 15.2% caustic soda which corresponds to a calculated 29.5% cellulose.

270 parts of the alkali cellulose containing 77 parts of cellulose are treated with 24.3 parts of carbon bisulfide and 17.5 parts of caustic soda. The carbon bisulfide is added all at once and the mixture is agitated in a suitable dough mixer at about 20° C. for 22 hours. After the xanthation is complete, the resulting mixture is diluted with 593 parts of water and the solution is stirred for 1½ hours. It is then aged at about 5° C. The mixture contains 6.5% caustic soda and 8.5% cellulose. Before use a vacuum is applied to remove air bubbles from the solution.

The present invention is applicable to all alkylated polymethylol melamine resins having from 4 to 6 methyleneoxy groups in which each alkyl group contains from 1 to 8 carbon atoms and to those similarly alkylated trimethylol melamines which contain at least ten carbon atoms. The methyleneoxy groups, —O—CH$_2$—, are each attached through the carbon atom to an amino nitrogen of the melamine and through the oxygen atom to either hydrogen or an alkyl group of from 1 to 8 carbon atoms. The degree of alkylation is not critical although generally we prefer a minimum of from about 33% to 50% based on the number of methyleneoxy groups. These resins, which are of the type described in the Johnstone and van Loo Reissure Patent No. 22,566, may be prepared as set forth in British Patent No. 566,347 by condensing melamine with a slight excess of formaldehyde over that theoretically required to produce the desired number of methylol groups and then reacting the methylol melamine obtained with an alcohol such as methanol, ethanol, propanol, isopropanol, butanol, isobutanol, tertiary butanol, the pentanols, the hexanols, the heptanols and the octanols. The resins may also be obtained by trans-esterification, i. e., reaction of methylated methylol melamine with a higher alcohol such as for example, n-butanol to form the n-butylated methylol melamine.

In addition to the resins of the specific example, suitable resins include the di- and tri-ethylated trimethylol melamines, the ethylated tetra-, penta-, and hexa-methylol melamines, the butylated tri-, tetra-, penta-, and hexa-methylol melamines, di- and tri-propylated trimethylol melamines, the propylated tetra-, penta-, and hexa-methylol melamines, etc.

We prefer use of those alkylated polymethylol melamine resins which contain from 4 to 6 methyleneoxy groups in which case there is no limit on the number of carbon atoms and more particularly, of the methylated tetra-, penta-, and hexa-methylol melamines.

From about 2% to 10% of resin and preferably about 5%, based on the cellulose content of the viscose or other cellulose solution, is used in our process. The resin may be added directly to the viscose dope which is then spun as usual or it may be added to the dope just behind the spinneret in which case an injection-spinning procedure is followed.

The process of the present invention produces regenerated cellulosic fibers having marked decreased water absorption. While the fibers also possess some affinity for acid dyeing, animalization of the viscose is not satisfactory. It is therefore within our contemplation to combine the process of the present application with that of our copending application referred to above for the production of cellulosic fibers or fabrics which possess both decreased water absorption and a satisfactory affinity for acid dyeing. Thus, a cationic aminotriazine-aldehyde resin acid colloid as described in U. S. Patents Nos. 2,345,543 and 2,417,014 and an alkylated methylol melamine resin falling within the group of alkylated methylol melamine resins herein described as being suitable may be added to viscose dope and fibers of the desired properties obtained by spinning thereof.

The process of the present invention may be applied to solutions of other cellulosic derivatives than the xanthates, for example, cellulose acetate.

We claim:

1. A process which comprises adding to a viscose dope a resin selected from the group consisting of alkylated trimethylol melamines containing at least 10 carbon atoms in which each alkyl group contains from 1 to 8 carbon atoms, and alkylated polymethylol melamines containing from 4 to 6 methyleneoxy groups in which each alkyl group contains from 1 to 8 carbon atoms, and regenerating the cellulose whereby a product of decreased water absorption is obtained.

2. A process which comprises adding to a viscose dope a methylated tetramethylol melamine resin, and regenerating the cellulose whereby a product of decreased water absorption is obtained.

3. A process which comprises adding to a viscose dope a methylated pentamethylol melamine resin, and regenerating the cellulose whereby a product of decreased water absorption is obtained.

4. A process which comprises adding to a viscose dope a methylated hexamethylol melamine resin, and regenerating the cellulose whereby a product of decreased water absorption is obtained.

5. A process which comprises adding to a viscose dope a methylated polyalkylol melamine resin containing 5.5 methyleneoxy groups, and regenerating the cellulose whereby a product of decreased water absorption is obtained.

6. A process which comprises forming a suspension in an alkaline viscose dope of a resin selected from the group consisting of alkylated trimethylol melamines containing at least 10 carbon atoms in which each alkyl group contains from 1 to 8 carbon atoms, and alkylated polymethylol melamines containing from 4 to 6 methyleneoxy groups in which each alkyl group contains from 1 to 8 carbon atoms, and precipitating the cellulose with the resins incorporated therein as a shaped solid.

7. A process which comprises forming a suspension in an alkaline viscose dope of a methylated pentamethylol melamine resin, and precipitating the cellulose with the resin incorporated therein as a shaped solid.

8. A process which comprises forming a suspension in an alkaline viscose dope of a methylated hexamethylol melamine resin, and precipitating the cellulose with the resin incorporated therein as a shaped solid.

References Cited in the file of this patent

UNITED STATES PATENTS

| Number | Name | Date |
| --- | --- | --- |
| 2,155,067 | Ubbelohde | Apr. 18, 1939 |
| 2,197,357 | Widmer et al. | Apr. 16, 1940 |
| 2,426,379 | Swain et al. | Aug. 26, 1947 |
| 2,462,185 | Hauser | Feb. 22, 1949 |

FOREIGN PATENTS

| Number | Country | Date |
| --- | --- | --- |
| 52,796 | Holland | July 15, 1942 |